US008675583B2

(12) United States Patent
Lee et al.

(10) Patent No.: US 8,675,583 B2

(45) Date of Patent: Mar. 18, 2014

(54) METHOD OF PERFORMING WIRELESS COMMUNICATION IN MULTI-CARRIER SYSTEM

(75) Inventors: Young Dae Lee, Anyang-si (KR); Sung Duck Chun, Anyang-si (KR); Seung June Yi, Anyang-si (KR); Sung Jun Park, Anyang-si (KR)

(73) Assignee: LG Electronics Inc., Seoul (KR)

(*) Notice: Subject to any disclaimer, the term of this patent is extended or adjusted under 35 U.S.C. 154(b) by 191 days.

(21) Appl. No.: 13/255,032

(22) PCT Filed: Apr. 20, 2010

(86) PCT No.: PCT/KR2010/002459

§ 371 (c)(1), (2), (4) Date: Sep. 6, 2011

(87) PCT Pub. No.: WO2010/123253

PCT Pub. Date: Oct. 28, 2010

(65) Prior Publication Data

US 2011/0317628 A1 Dec. 29, 2011

Related U.S. Application Data

(60) Provisional application No. 61/171,440, filed on Apr. 21, 2009.

(30) Foreign Application Priority Data

Apr. 15, 2010 (KR) ........................ 10-2010-0034977

(51) Int. Cl.
*H04W 4/00* (2009.01)

(52) U.S. Cl.
USPC .......................................................... 370/329

(58) Field of Classification Search
USPC .............. 370/328, 329, 331, 310, 310.2, 312, 370/313, 315, 322, 330, 338, 468, 341
See application file for complete search history.

(56) References Cited

U.S. PATENT DOCUMENTS

| | | | | |
|---|---|---|---|---|
| 6,046,990 | A * | 4/2000 | Chennakeshu et al. | 370/317 |
| 7,990,840 | B2 * | 8/2011 | Laroia et al. | 370/208 |
| 2005/0201476 | A1 | 9/2005 | Kim et al. | |
| 2007/0081449 | A1 | 4/2007 | Khan | |
| 2007/0121546 | A1 | 5/2007 | Zuckerman et al. | |
| 2007/0127516 | A1 * | 6/2007 | Czaja et al. | 370/445 |
| 2008/0020757 | A1 * | 1/2008 | Hans et al. | 455/432.2 |

FOREIGN PATENT DOCUMENTS

| | | | |
|---|---|---|---|
| EP | 1 773 085 | A1 | 4/2007 |

* cited by examiner

*Primary Examiner* — Anh Ngoc Nguyen

(74) *Attorney, Agent, or Firm* — Birch, Stewart, Kolasch & Birch, LLP

(57) ABSTRACT

A method of performing wireless communication in a multi-carrier system by a User Equipment (UE) comprises receiving minimum aggregation information on at least one carrier which is determined as a default irrespective of carriers supportable by the UE, configuring the at least one carrier on a basis of the minimum aggregation information, and performing communication using the at least one carrier.

11 Claims, 3 Drawing Sheets

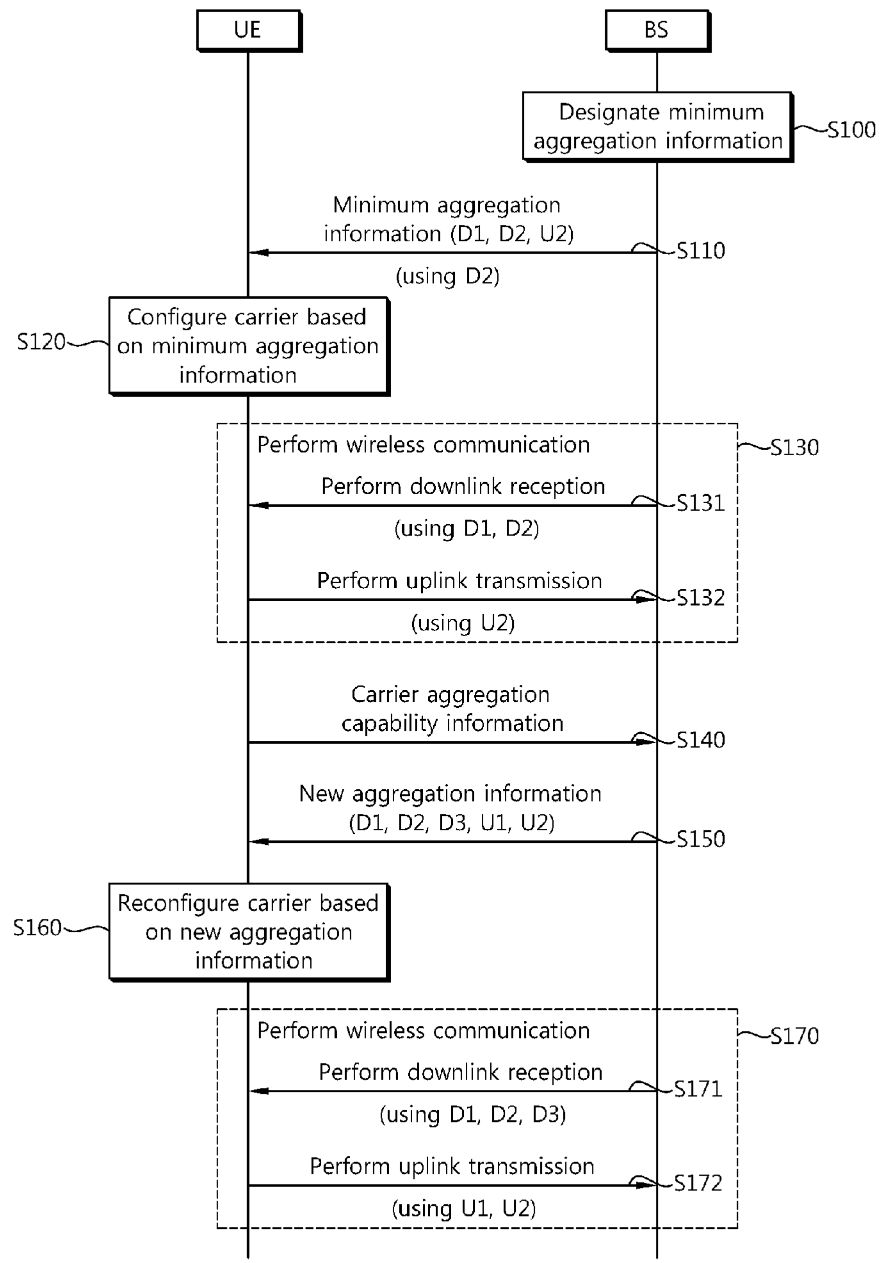
Fig. 5
UE
BS
Designate minimum aggregation information
S100
Minimum aggregation information (D1, D2, U2)
S110
(using D2)
S120
Configure carrier based on minimum aggregation information
Perform wireless communication
S130
Perform downlink reception
S131
(using D1, D2)
Perform uplink transmission
S132
(using U2)
Carrier aggregation capability information
S140
New aggregation information (D1, D2, D3, U1, U2)
S150
S160
Reconfigure carrier based on new aggregation information
Perform wireless communication
S170
Perform downlink reception
S171
(using D1, D2, D3)
Perform uplink transmission
S172
(using U1, U2)

METHOD OF PERFORMING WIRELESS COMMUNICATION IN MULTI-CARRIER SYSTEM

This application is a National Phase of PCT/KR2010/002459 filed on Apr. 20, 2010, which claims priority under 35 USC 119(e) to U.S. Provisional Application No. 61/171,440 filed on Apr. 21, 2009 and under 35 USC 119(a) to Patent Application No. 10-2010-0034977 filed in Republic of Korea, on Apr. 15, 2010, all of which are hereby expressly incorporated by reference into the present application.

TECHNICAL FIELD

The present invention relates to wireless communication, and more particularly, to a method of performing wireless communication in a multi-carrier system.

BACKGROUND ART

Wireless communication systems are widely spread all over the world to provide various types of communication services such as voice or data communication. In general, a wireless communication system is a multiple access system capable of supporting communication with multiple users by sharing available radio resources. Examples of multiple access systems include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc.

In a wireless communication system, one carrier is considered in general even if a bandwidth is differently set between an uplink and a downlink. In the 3rd generation partnership project (3GPP) long term evolution (LTE), one carrier constitutes each of the uplinks and the downlinks on the basis of a single carrier, and the bandwidth of the uplink is symmetrical to the bandwidth of the downlink. However, except for some areas of the world, it is not easy to allocate frequencies of wide bandwidths. Therefore, as a technique for effectively using fragmented small bands, a spectrum aggregation technique is being developed to obtain the same effect as when a band of a logically wide bandwidth is used by physically aggregating a plurality of bands in a frequency domain. The spectrum aggregation includes a technique for supporting a system bandwidth of 100 mega Hertz (MHz) by using multiple carriers even if, for example, the 3GPP LTE supports a bandwidth of up to 20 MHz, and a technique for allocating an asymmetric bandwidth between the uplink and the downlink.

A UE (User Equipment) can have a different capability for the reception of downlink carriers or the transmission of uplink carriers. For example, one UE may only support an aggregation of uplink/downlink carriers of 20 MHz or less while another UE may only support an aggregation of uplink/downlink carriers of 100 MHz or less. Because of such a restriction, a BS (Base Station) needs to determine how an aggregation of carriers should be established when a specific UE first performs communication with the BS.

DISCLOSURE OF INVENTION

Technical Problem

Accordingly, the present invention has been devised in view of the above problems, and it is an object of the present invention to provide a method of performing wireless communication, wherein multiple carriers between a UE and a BS can be easily established.

Solution to Problem

According to a first aspect of the present invention, a method of performing wireless communication in a multi-carrier system by a User Equipment (UE) is provided wherein the base station has a plurality of M carriers for performing wireless communication. The method includes: receiving minimum aggregation information defining a number n of carriers where $1 \le n < M$; configuring at least one carrier on the basis of the minimum aggregation information; and performing wireless communication with the base station using the configured at least one carrier.

According to a second aspect of the present invention, a method of performing wireless communication in a multi-carrier system by a Base Station (BS) is provided. The method includes transmitting, to a UE, minimum aggregation information defining a number n of carriers where $1 \le n < M$ to enable the UE to configure at least one carrier on the basis of the minimum aggregation information; and performing a wireless communication from the UE via the at least one carrier.

A third aspect of the invention provides a user equipment for performing wireless communication in a multi-carrier system with a base station, wherein the base station has a plurality of M carriers for performing wireless communication, the user equipment comprising: a transceiver for receiving minimum aggregation information defining a number n of carriers where $1 \le n < M$; a processor for configuring at least one carrier on the basis of the minimum aggregation information; and wherein the transceiver is operable to perform wireless communication using the configured at least one carrier.

A fourth aspect of the invention provides a base station for performing wireless communication in a multi-carrier system with at least one user equipment (UE), the base station comprising: means for providing minimum aggregation information defining a number n of carriers where $1 \le n < M$ to enable a UE in the multi carrier system to configure at least one carrier on the basis of the minimum aggregation information; and a transceiver for transmitting, to a UE the minimum aggregation information; and receiving performing a wireless communication from with the UE via the configured at least one carrier.

In embodiments of the invention:

n corresponds to the minimum number of carriers which any UE is capable of using in the multicarrier system.

the minimum aggregation information may be received or transmitted via one of the n carriers the minimum aggregation information may be received or transmitted via at least one of a broadcast channel, a Common Control Channel (CCCH) and a Radio Resource Control (RRC) message.

the method may include receiving or transmitting new aggregation information on at least one of the M carriers supportable by the UE according to the carrier aggregation capability of the UE; and configuring the carriers supportable by the UE, on a basis of the new aggregation information.

the new aggregation information may be based on the UE capability the new aggregation information may be transmitted through a Dedicated Control Channel (DCCH).

the new aggregation information may be included in a Radio Resource Control (RRC) message, wherein the RRC message is any one of an RRC connection setup message, an RRC connection reconfiguration message, and an RRC connection reestablishment message.

wherein the minimum aggregation information may be received or transmitted through a carrier on which the UE is camping before the minimum aggregation information is received.

Advantageous Effects of Invention

In accordance with the present invention, a BS primarily transmits minimum aggregation information to a UE. Accordingly, a fast wireless configuration can be induced. Further, the BS secondarily transmits, to the UE, new aggregation information in which the capability of the UE is taken into consideration. Accordingly, a more accurate wireless configuration can be acquired. Through such a hierarchical aggregation information transmission method, a wireless configuration in a multi-carrier system can be more facilitated.

BRIEF DESCRIPTION OF DRAWINGS

FIG. 5 is a flowchart illustrating a method of performing wireless communication in a multi-carrier system according to an embodiment of the present invention.

MODE FOR THE INVENTION

Figure 1:
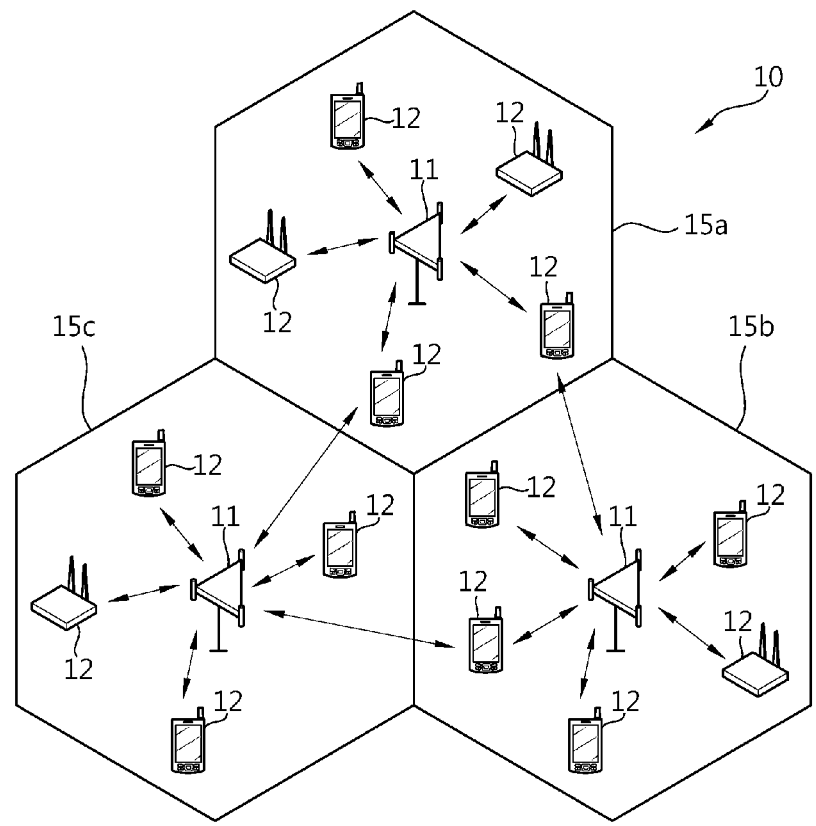
FIG. 1 schematically illustrates a wireless communication system.

FIG. 1 illustrates a wireless communication system. A wireless communication system 10 includes at least one base station (BS) 11. Each base station 11 provides a communication service to a particular geographical area 15*a*, 15*b*, or 15*c* (which are generally called cells). Each cell may be divided into a plurality of areas (which are also called sectors). A mobile station (MS) 12 may be fixed or mobile, and may be referred to by other names such as user equipment (UE), user terminal (UT), subscriber station (SS), wireless device, personal digital assistant (PDA), wireless modem, handheld device, etc. The BS 11 generally refers to a fixed station that communicates with the MS 12 and may be called by other names such as evolved-node B (eNB), base transceiver system (BTS), access point (AP), etc. Downlink (DL) refers to communication from the BS 11 to the MS 12, and uplink (UL) refers to communication from the MS 12 to the BS 11. In the downlink, a transmitter may be a part of the BS 11 and a receiver may be a part of the MS 12. In the uplink, a transmitter may be a part of the MS 12 and a receiver may be a part of the BS 11.

Spectrum aggregation (or bandwidth aggregation or a carrier aggregation) supports a plurality of carriers. A carrier is defined by a bandwidth and a center frequency. The spectrum aggregation is adopted to support increasing throughput, prevent an increase in a cost due to an introduction of a wideband radio frequency (RF) element, and guarantee compatibility with an existing system. For example, if four carriers are assigned as granularity of a carrier unit having a 5 MHz bandwidth, a maximum bandwidth of 20 MHz can be supported.

Spectrum aggregation may be divided into a contiguous spectrum aggregation and a non-contiguous spectrum aggregation. Contiguous spectrum aggregation uses contiguous carriers and the non-contiguous spectrum aggregation uses discontiguous carriers. The number of aggregated carriers may different in uplink and downlink. When the number of downlink carriers and that of uplink carriers are equal, the aggregation is referred to as symmetric aggregation, and when the numbers are different, the aggregation is referred to as asymmetric aggregation.

The size (i.e., the bandwidth) of aggregated multiple carriers may vary. For example, when five carriers are used to configure a 70 MHz band, they may be configured as 5 MHz carrier (carrier #0)+20 MHz carrier (carrier #1)+20 MHz carrier (carrier #2)+20 MHz carrier (carrier #3)+5 MHz carrier (carrier #4).

In the following description, a multi-carrier system refers to a system supporting multiple carriers based on the spectrum aggregation. Contiguous spectrum aggregation and/or non-continuous spectrum aggregation may be used in the multi-carrier system, and in addition, either symmetrical aggregation or asymmetrical aggregation may be used.

Figure 2:
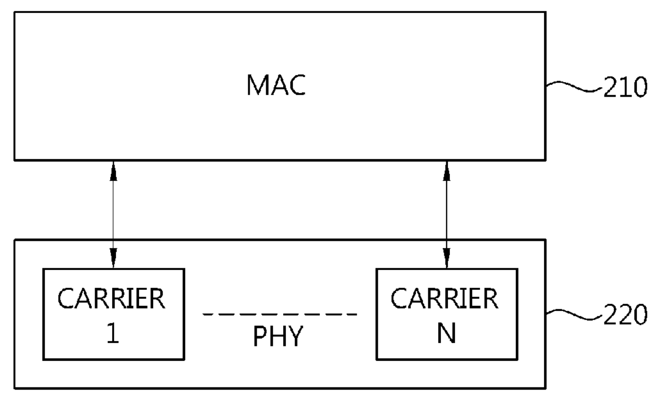
FIG. 2 schematically illustrates an example of a protocol structure for supporting multiple carriers.

FIG. 2 illustrates an example of a protocol structure for supporting multiple carriers. A common medium access control (MAC) entity 210 manages a physical (PHY) layer 220 which uses a plurality of carriers. A MAC management message transmitted by a particular carrier may be applied to other carriers. The PHY layer 220 may operate in a TDD (Time Division Duplex) and/or FDD (Frequency Division Duplex) scheme.

There are several physical control channels used in the physical layer 220. A physical downlink control channel (PDCCH) may inform the UE about the resource allocation of paging channel (PCH) and downlink shared channel (DL-SCH), as well as hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control information such as HARQ AC/NAK in response to downlink transmission, scheduling request and channel quality indicator (CQI). A physical uplink shared channel (PUSCH) carries uplink shared channel (UL-SCH).

Figure 3:
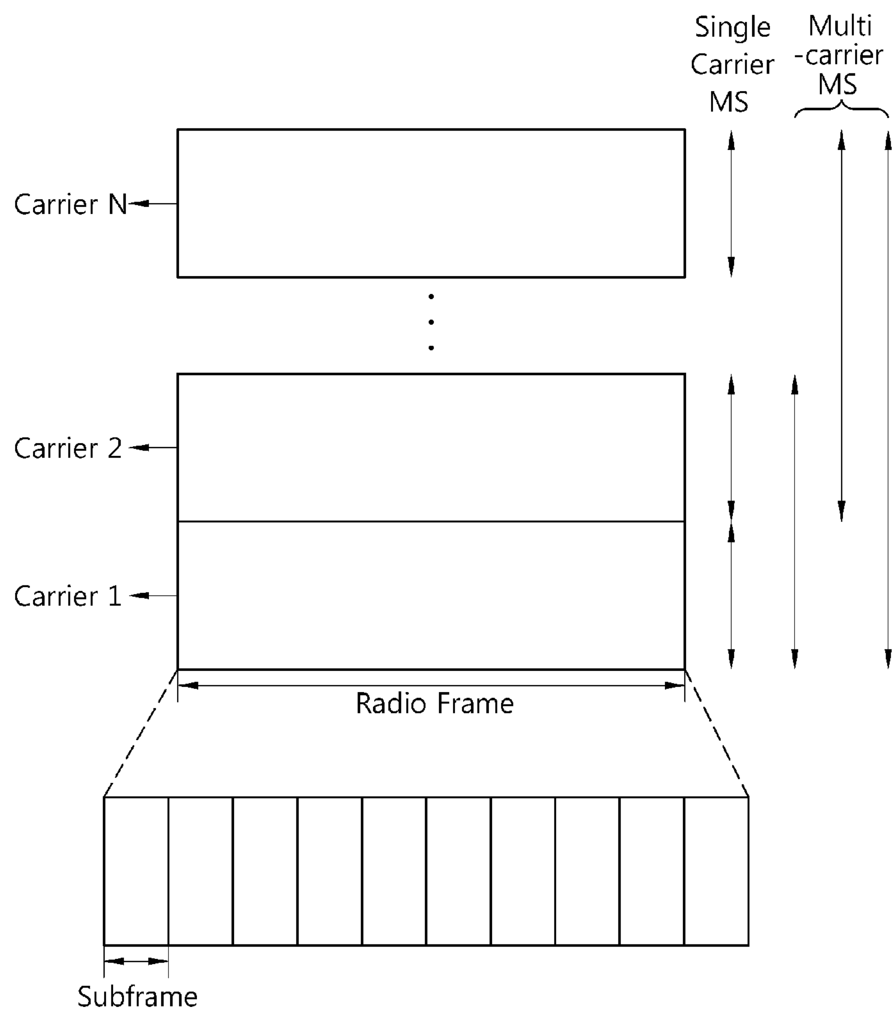
FIG. 3 illustrates an example of a frame structure for operating multiple carriers.

FIG. 3 illustrates an example of a frame structure for operating multiple carriers. A radio frame includes 10 subframes. Each carrier may have its own control channel, i.e. PDCCH. Some carriers may have only a portion of the SFH. Multiple carriers may be or may not be contiguous to each other. An MS may support one or more carriers according to its capability.

Carriers may be divided into a fully configured carrier and a partially configured carrier depending on their directionality. A fully configured carrier refers to a bidirectional carrier that can transmit and/or receive every control signal and data, and a partially configured carrier refers to a unidirectional carrier that can transmit only downlink data. A partially configured carrier may be largely used for an MBS (Multicast and Broadcast Service) and/or an SFN (Single Frequency Network). A fully configured carrier is a standalone carrier for which all control channels including synchronization, broadcast, multicast and unicast control signaling are configured. A partially configured carrier is a carrier configured for downlink only transmission in TDD or a downlink carrier without paired UL carrier in FDD mode.

Carriers may be divided into a primary carrier and a secondary carrier depending on whether they are activated. The primary carrier refers to a carrier that is constantly activated, and the secondary carrier refers to a carrier that is activated or deactivated according to particular conditions. Activation means that transmission or reception of traffic data is performed or traffic data is ready for its transmission or reception. Deactivation means that transmission or reception of traffic data is not permitted. In the deactivation mode, measurements can be made or minimum information can be transmitted or received. The MS uses only a single primary carrier or one or more secondary carriers along with the primary carrier. The MS may be assigned the primary carrier and/or the second carriers by the BS. A primary carrier is a carrier used by a BS to exchange traffic and PHY/MAC control signaling (e.g., MAC control messages) with an MS. Secondary carriers are additional carriers which the MS may use for traffic, only per BS's specific commands and rules received on the primary carrier. The primary carrier may be a fully configured carrier, by which major control information is exchanged between the BS and the MS. The secondary carrier may be a fully configured carrier or a partially configured carrier, which is allocated according to a request of the MS or according to an instruction of the BS. The primary carrier may be used for entering of the MS into a network or for an allocation of the secondary carrier. The primary carrier may be selected from among fully configured carriers, rather than being fixed to a particular carrier. A carrier set as the secondary carrier may be changed to a primary carrier.

Figure 4:
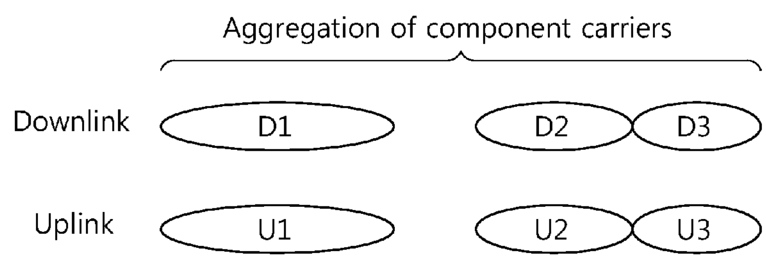
FIG. 4 shows a mapping relation between a downlink carrier and an uplink carrier in a multiple carrier system according to at least one embodiment of the present invention.

FIG. 4 shows a mapping relation between a downlink carrier and an uplink carrier in a multiple carrier system according to at least one embodiment of the present invention.

Referring to FIG. 4, in a FDD system, downlink carriers are mapped to respective uplink carriers. D1 is mapped to U1, D2 is mapped to U2, and D3 is mapped to U3. A BS can designate D1, D2, and D3 as an aggregation of downlink carriers and U1, U2, and U3 as an aggregation of uplink carriers. A UE checks a correspondence and a mapping relation between the downlink carriers and the uplink carriers on the basis of system information transmitted by a logical channel BCCH or a UE-dedicated RRC message transmitted by a logical channel DCCH. Although the one-to-one mapping relation between the downlink carriers and the uplink carriers is illustrated in FIG. 4, the downlink carriers and the uplink carriers can have a mapping relation of 1:n or n:1. i.e. a downlink carrier can be mapped to one or more uplink carriers and an uplink carrier can be mapped to one or more downlink carriers.

In general, downlink transmission requires a wider bandwidth than uplink transmission. Accordingly, in the case in which a BS instructs the configuration or activation of a specific carrier, a specific downlink carrier and a corresponding uplink carrier can be implicitly configured or cannot be activated together with consideration taken of downlink transmission requiring a wider bandwidth than uplink transmission. Only when the BS instructs the configuration or activation of a specific uplink carrier, the specific uplink carrier and a corresponding downlink carrier can be implicitly configured or activated together. Accordingly, in the case in which a BS wants to configure or activate a specific downlink carrier and, at the same time, configure or activate an uplink carrier mapped to the specific downlink carrier together, the BS must explicitly instruct a UE to configure or activate the mapped uplink carrier.

Since different UEs have different carrier aggregation capabilities, carriers that can be supported by a UE may differ according to the UE. For example, one UE does not support a carrier D1, but the other UE can support the carrier D1. When a specific UE is first accessed, a BS does not know if the UE will support all the carriers D1, D2, and D3 or support only some of the carriers D1, D2, and D3. In this case, the BS needs to inform all the UEs of minimum carrier aggregation information.

FIG. 5 is a flowchart illustrating a method of performing wireless communication in a multi-carrier system according to an embodiment of the present invention.

Referring to FIG. 5, a BS designates at least one carrier n of a plurality of M carriers as minimum aggregation information at step S100. The minimum aggregation information is information on at least one carrier which is determined by default irrespective of carriers that can be supported by a UE. The minimum aggregation information can be used in the case in which a UE has not received its dedicated carrier aggregation information or a UE first performs access. The BS can inform a UE of minimum carrier aggregation information necessary for communication through the minimum aggregation information because it does not have information on carriers supported by the UE. The minimum aggregation information can also be called default aggregation information. The at least one carrier designated as the minimum aggregation information can be an uplink carrier (for example, U1). Alternatively, the at least one carrier designated as the minimum aggregation information can be downlink carriers (for example, D1 and D2).

There are several methods of the BS designating the at least one carrier as the minimum aggregation information.

For example, the BS can designate a carrier, being camped on by a UE, as the minimum aggregation information. For example, in FIG. 4, during the time for which a UE camps on a carrier D2, the BS can designate the carriers D2 and D3 as the minimum aggregation information on the downlink and designate only a carrier U2 as the minimum aggregation information on the uplink.

In another example, the BS can designate the minimum aggregation information by considering whether a carrier is accessible to only a specific UE or whether the carrier provides a specific service. For example, a carrier which transmits a Public Warning System (PWS) message or Multimedia Broadcast Multicast Service (MBMS) service can be designated as the minimum aggregation information. PWS is a terminology, including the Earthquake and Tsunami Warning System (ETWS) (i.e., a public warning system in Europe/Japan) and the Commercial Mobile Alert System (CMAS) (i.e., a public warning system in North America). PWS is a warning message transmission method supported in the 3rd Generation Partnership Project (3GPP) system. The PWS message can be an ETWS message or a CMAS message depending on areas. In Long Term Evolution (LTE), the PWS message is down-transmitted with it loaded on a system information block.

The UE receives the minimum aggregation information from the BS at step S110. A carrier in which the minimum aggregation information is transmitted can be a carrier on which the UE is camping. For example, during the time for which the UE camps on a carrier D2, the BS can transmit the minimum aggregation information to the UE using the carrier D2. Further, the minimum aggregation information can be included in system information and transmitted through a broadcast channel (in particular, a BCCH). For another example, the minimum aggregation information can be transmitted through a Common Control Channel (CCCH).

The UE configures at least one carrier on the basis of the minimum aggregation information at step S120. Here, the configuration means that a UE and a BS configure radio access for performing wireless communication using multiple carriers.

The UE performs wireless communication with the BS using the at least one configured carrier at step S130. The UE receives a downlink channel from carriers designated as the minimum aggregation information or transmits an uplink channel. For example, in the case in which the minimum aggregation information includes only downlink carriers D1 and D2 and an uplink carrier U2, the UE can perform downlink reception using the downlink carriers D1 and D2 until its dedicated aggregation information is received at step S131 and perform uplink transmission using the uplink carrier U2 at step S132.

The BS can perform communication using carriers designated as the minimum aggregation information irrespective of whether the UE is in an idle state or an RRC connection state. For example, a UE camping on the downlink carrier D2 (i.e., in the idle state) can receive system information, a paging message, a PWS message, and MBMS service using the downlink carrier D1 designated as the minimum aggregation information. The UE (i.e., the idle state) can send an RRC connection request message to the BS by performing random access through at least one uplink carrier designated as the minimum aggregation information.

The UE transmits information on its carrier aggregation capability to the BS at step S140. The UE receives new aggregation information on carriers which can be supported by the UE from the BS at step S150. Here, the new aggregation information is aggregation information on carriers which have been newly designated by the BS with consideration taken of the carrier aggregation capability of the UE. That is, the new aggregation information is dedicated to the UE. For example, the minimum aggregation information is the carriers D1, D2, and U2, but the new aggregation information can be carriers D1, D2, D3, U1, and U2.

The UE is in the RRC connection state, and it receives the new aggregation information through a Dedicated Control Channel (DCCH) (i.e., a dedicated channel). The UE may also receive the new aggregation information through a Common Control Channel (CCCH). Meanwhile, the UE receives the new aggregation information using any one downlink carrier (for example, the downlink carrier D2) designated as the minimum aggregation information, from among the downlink carriers D1, D2, D3, U1, and U2. Here, the UE can remove the minimum aggregation information while storing the new aggregation information.

The new aggregation information is an RRC message generated in a Radio Resource Control (RRC) layer and can be any one of an RRC connection setup message, an RRC connection reconfiguration message, and an RRC connection reestablishment message.

The UE reconfigures carriers on the basis of the new aggregation information at step s160. The UE performs communication with the BS using new carriers designated as the new aggregation information at step S170. For example, downlink carriers designated as the new aggregation information can include downlink carriers D1, D2, and D3, and uplink carriers can include uplink carriers U1 and U2. The UE that has received the new aggregation information can receive downlink channels through the downlink carriers D1, D2, and D3 at step S171 and can transmit uplink channels through the uplink carriers U1 and U2 at step S172. In the case in which the UE supports the PWS, the BS can include downlink carriers which are included in the new aggregation information and provided by the PWS.

As described above, a BS primarily transmits minimum aggregation information to a UE. Accordingly, a fast wireless configuration can be induced. Further, the BS secondarily transmits, to the UE, new aggregation information in which the capability of the UE is taken into consideration. Accordingly, a more accurate wireless configuration can be acquired. Through such a hierarchical aggregation information transmission method, a wireless configuration in a multi-carrier system can be more facilitated.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of performing wireless communication in a multi-carrier system between a User Equipment (UE) and a base station, wherein the base station has a plurality of M carriers for performing wireless communication, the method comprising:

receiving minimum aggregation information defining a number n of carriers where $1 \leq n < M$, wherein n corresponds to a minimum number of carriers which any UE is capable of using in the multicarrier system;

configuring at least one carrier on the basis of the minimum aggregation information;

receiving new aggregation information on at least one of the M carriers supportable by the UE according to a carrier aggregation capability of the UE, wherein the new aggregation information is based on the carrier aggregation capability of the UE;

configuring at least one UE supportable carrier on the basis of the new aggregation information; and performing wireless communication with the base station using the configured at least one carrier and/or the configured at least one UE supportable carrier.

2. The method of claim 1, wherein the minimum aggregation information is received via one of the n carriers.

3. The method of claim 1, wherein the minimum aggregation information is received via at least one of a broadcast channel, a Common Control Channel (CCCH) and a Radio Resource Control (RRC) message.

4. The method of claim 1, wherein the new aggregation information is transmitted through a Dedicated Control Channel (DCCH).

5. The method of claim 1, wherein the new aggregation information is received through a Radio Resource Control (RRC) message, and wherein the RRC message is any one of an RRC connection setup message, an RRC connection reconfiguration message, and an RRC connection reestablishment message.

6. The method of claim 1, wherein the minimum aggregation information is received through a carrier on which the UE is camping before the minimum aggregation information is received.

7. A method of performing wireless communication in a multi-carrier system between a Base Station (BS) and at least one user equipment (UE), the method comprising:

transmitting, to a UE, minimum aggregation information defining a number n of carriers where $1 \leq n < M$ to enable the UE to configure at least one carrier on the basis of the minimum aggregation information, wherein n corresponds to a minimum number of carriers which any UE is capable of using in the multicarrier system;

transmitting, to the UE, new aggregation information on at least one of the M carriers supportable by the UE according to the carrier aggregation capability of the UE, wherein the new aggregation information is based on the carrier aggregation capability of the UE, and wherein at least one UE supportable carrier is configured on the basis of the new aggregation information; and performing a wireless communication from the UE via the at least one carrier and/or the configured at least one UE supportable carrier.

8. The method of claim 7, wherein the minimum aggregation information is transmitted via one of the n carriers.

9. The method of claim 7, wherein the minimum aggregation information is transmitted via at least one of a broadcast channel, a Common Control Channel (CCCH) and a Radio Resource Control (RRC) message.

10. A user equipment for performing wireless communication in a multicarrier system with a base station, wherein the base station has a plurality of M carriers for performing wireless communication, the user equipment comprising:

a transceiver configured to receive minimum aggregation information defining a number n of carriers where $1 \leq n < M$, wherein n corresponds to a minimum number of carriers which any UE is capable of using in the multicarrier system; and a processor configured to configure at least one carrier on the basis of the minimum aggregation information, wherein the transceiver is further configured to receive new aggregation information on at least one of the M carriers supportable by the UE according to the carrier aggregation capability of the UE, wherein the new aggregation information is based on the carrier aggregation capability of the UE, wherein the processor is further configured to configure at least one UE supportable carrier on the basis of the new aggregation information, and wherein the transceiver is operable to perform wireless communication using the configured at least one carrier and/or the configured at least one UE supportable carrier.

11. A base station for performing wireless communication in a multicarrier system with at least one user equipment (UE), wherein the base station has a plurality of M carriers for performing wireless communication, the base station comprising:

means for transmitting minimum aggregation information defining a number n of carriers where $1 \leq n < M$ to enable a UE in the multi carrier system to configure at least one carrier on the basis of the minimum aggregation, wherein n corresponds to a minimum number of carriers which any UE is capable of using in the multicarrier system information;

means for transmitting, to the UE, new aggregation information on at least one of the M carriers supportable by the UE according to the carrier aggregation capability of the UE, wherein the new aggregation information is based on the carrier aggregation capability of the UE, and wherein at least one UE supportable carrier is configured on the basis of the new aggregation information; and means for performing a wireless communication from the UE via the at least one carrier and/or the configured at least one UE supportable carrier.

* * * * *